United States Patent [19]

Wentworth

[11] Patent Number: 4,509,773
[45] Date of Patent: Apr. 9, 1985

[54] PUMP-MECHANICAL SEAL CONSTRUCTION WITH AXIAL ADJUSTMENT MEANS

[75] Inventor: Robert S. Wentworth, Murrieta, Calif.

[73] Assignee: Borg-Warner Corporation, Chicago, Ill.

[21] Appl. No.: 608,627

[22] Filed: May 9, 1984

[51] Int. Cl.³ .............................................. F16J 15/38
[52] U.S. Cl. ........................................ 277/82; 277/84; 277/85; 277/92; 277/93 SD
[58] Field of Search .................... 277/40, 41, 81 R, 82, 277/84, 85, 91, 92, 93 R, 93 SD, 105, 106, 112

[56] References Cited

U.S. PATENT DOCUMENTS

| | | | |
|---|---|---|---|
| 2,802,679 | 8/1957 | Taltavall | 277/82 X |
| 3,241,844 | 3/1966 | Morley | 277/92 |
| 3,508,767 | 4/1970 | Christ et al. | 277/85 X |
| 4,418,919 | 12/1983 | Wentworth | 277/92 X |

FOREIGN PATENT DOCUMENTS 361172  5/1962  Switzerland ........................ 277/84

Primary Examiner—Robert S. Ward
Attorney, Agent, or Firm—Aubrey L. Burgess

[57] ABSTRACT

A pump-mechanical seal assembly in which the setting of the mechanical seal is maintained when the pump impeller's position is adjusted relative to the pump housing, and means to accomplish this objective.

6 Claims, 3 Drawing Figures

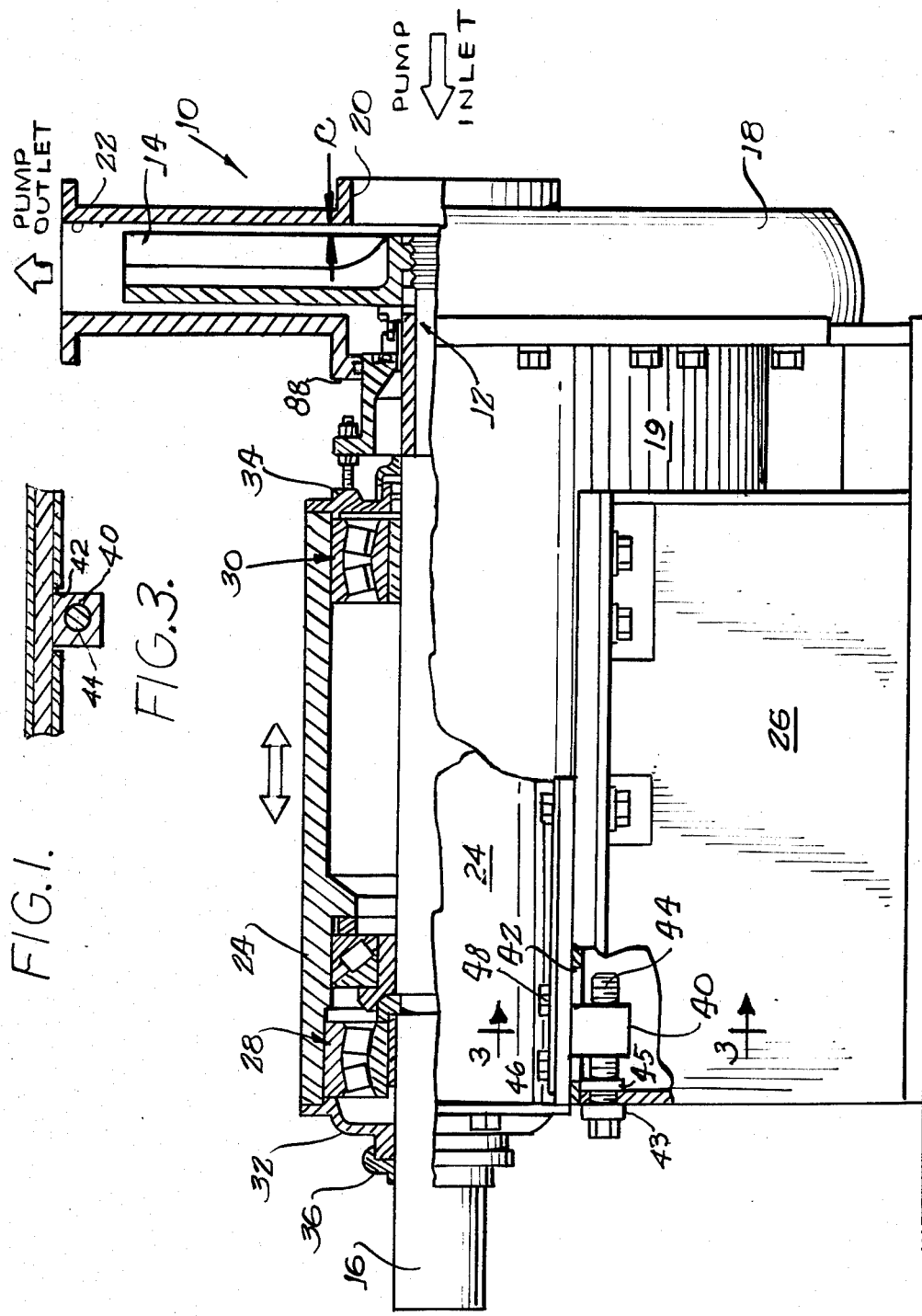

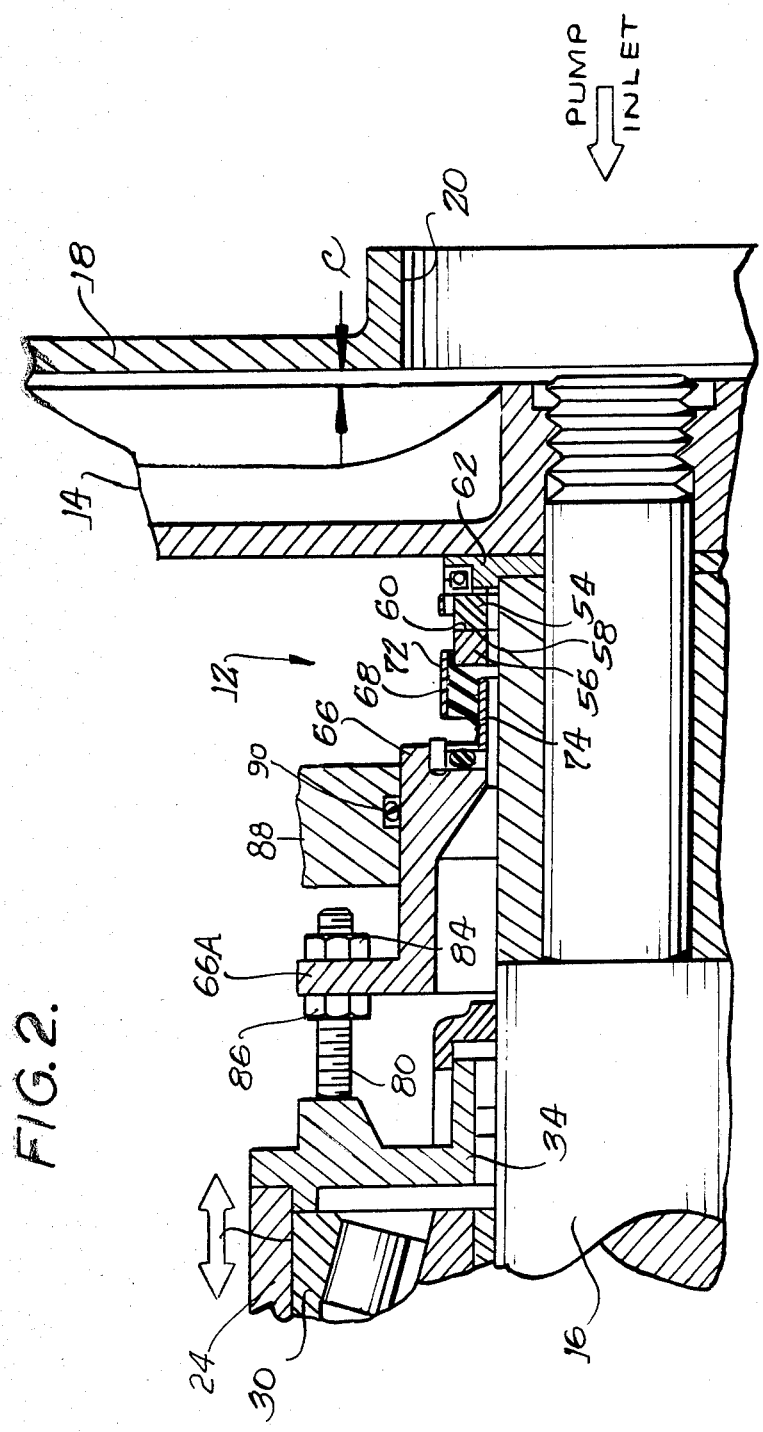

PUMP-MECHANICAL SEAL CONSTRUCTION WITH AXIAL ADJUSTMENT MEANS

A centrifugal pump generally comprises a pump housing, and a centrifugal impeller for pumping a fluid from an inlet in the housing to an outlet or discharge, also in the housing. The impeller is mounted on a shaft and is driven by a prime mover, such as an electric motor. A packing is located between the impeller and the motor to prevent the flow or leakage of fluid being pumped along the motor shaft and ultimately to the motor or to the atmosphere. Mechanical seal assemblies are frequently used for the packing, each mechanical seal comprising a pair of seal rings having opposed seal faces, at least one of which is resiliently urged toward the other. One seal ring is stationary and usually is connected to the pump housing. The other seal ring is connected to rotate with the shaft and the impeller. When assembled, the seal parts are set in a predetermined spacial relationship and in such a manner that the resilient force urging one ring toward the other is of a pretermined magnitude, and this relationship is the setting of the mechanical seal assembly. The mechanical seal assembly may be constructed of a series of mechanical seals, each having the conventional parts, as described.

In many centrifugal pumps, the rotating assembly, i.e., the impeller, the shaft, bearings supporting the shaft, and non-rotating brackets or other means supporting the bearings, are axially adjustable to establish an initial and close clearance at the inlet between the housing and the impeller, and to adjust or maintain this close clearance which can change due to wear of the pump parts. When the clearance between the housing and the impeller becomes too great, the pump wastes energy and loses pressure because the flow recirculates, i.e., "short circuits" at this location. Such adjustments which may reach a magnitude of an inch or two change the mechanical seal settings and thus require the adjustment thereof to reestablish the initial and/or the desired setting. This operation is time consuming and expensive. In multiple impeller pumps, the clearances between pump parts and the adjacent impeller must be adjustable to compensate for wear. Here too resetting one or more mechanical seals necessitated by pump parts-impeller wear is time consuming and expensive.

SUMMARY OF THE INVENTION

According to this invention, adjustment of the axial position of the impeller and other pump parts relative to the pump housing to compensate for wear can be performed without changing the setting of a mechanical seal assembly. This is accomplished by eliminating a relatively fixed connection between a part or parts of a mechanical seal assembly and the pump housing or other fixed/positioned part of a pump. Specifically, the mechanical seal assembly is associated with an axially movable and adjustable part or parts of the pump. In a specific arrangement, the pump impeller is rotatably connected to a shaft, the axial position of which is adjustable with respect to the pump housing. The mechanical seal assembly surrounds the shaft and is located between the impeller and a shaft bearing, the latter being supported by a bracket or other means having its axial position fixed relative to the shaft. One end of the seal assembly is fixed relative to the impeller and the other end is fixed relative to the bearing supporting means or bracket. Axial adjustment of the rotating parts is effected by shifting the position of the shaft relative to the pump housing. The seal and the parts having a fixed spacial relationship with respect to the shaft are thus axially adjusted with respect to the pump housing without changing the setting of the mechanical seal assembly.

BRIEF DESCRIPTION OF THE DRAWINGS

FIG. 1 is an elevation view, with portions broken away and shown in cross-section, of a typical centrifugal pump incorporating a mechanical seal assembly constructed according to this invention;

FIG. 2 is an enlarged cross-sectional view of a portion of a typical pump-mechanical seal assembly incorporating the invention herein being described; and FIG. 3 is a partial cross-sectional view taken on line 3—3 of FIG. 1 showing details of the carriage adjustment arrangement.

DETAILED DESCRIPTION OF THE PREFERRED EMBODIMENT

FIG. 1 illustrates a typical pump assembly 10 incorporating a mechanical seal assembly 12 constructed according to this invention. The pump assembly 10 comprises a centrifugal impeller 14 connected to rotatable shaft 16 which in turn is connected to a prime mover, such as an electric motor, not shown. The impeller 14 is located in a housing 18 fixed to a support 19, the housing 18 having an inlet 20 and an outlet 22. Fluid enters the housing 18 at the inlet 20 and is discharged at outlet 22. The shaft 16 is fixedly positioned in a carriage or cradle 24 which is supported by and axially adjustable with respect to a fixedly positioned base 26 and the housing 19. The housing 18 is bolted to the support 19 which is affixed to the base 26. The carriage/cradle 24 houses a pair of spaced bearings 28 and 30, each abutting bearing brackets 32 and 34, respectively. Bearings 28 and 30 journal the shaft 16. Bearing bracket 32 is associated with a dust/dirt seal means 36 which surrounds the shaft 16. The mechanical seal assembly 12 of this invention, constructed and arranged to substantially prevent the leakage of fluid being pumped from the impeller and pump housing along the motor shaft and ultimately to the motor or the atmosphere, surrounds the shaft 16 and is located between the bracket 34 and within a portion of the housing 18, and will be described in detail later.

Axial adjustment of the impeller 14 with respect to the housing 18 is to maintain, obtain or change the clearance C therebetween and is accomplished by axially moving the carriage/cradle 24. As illustrated in FIGS. 1 and 3, the carriage/cradle 24 is provided with a depending threaded member 40 fitting into an elongated slot 42 in the base 26. The threaded member 40 receives a screw 44 axially fixed by locating collars 43, 45 with respect to the base 26. Bolts 46, 48 which pass through elongated or slotted openings (not shown) in the carriage/cradle and into suitable threaded openings (also not shown) in the base 26 fixedly position the carriage/cradle 24 to the base. By loosening the bolts 46, 48 and rotating the screw 44, the axial position of the carriage/cradle 24, and thus the shaft 16 can be adjusted, which also adjusts the clearance C. By tightening the bolts 46, 48 the carriage/cradle is again fixed in position. A suitable gauge may be provided if desired to indicate the distance moved.

The mechanical assembly 12 (see FIG. 2) comprises a pair of seal rings 54, 56 surrounding the shaft 16, each seal ring having an opposing, lapped seal face, 58 and 60. Seal ring 54 is rotatable with the shaft 16, being connected to a cylindrical sleeve 62 surrounding the shaft 16 and abutting the impeller 14. The ring 56 is stationary and is connected via a flanged, generally cylindrical follower 66 to the bearing bracket 34. In the embodiment illustrated, a rubber or other elastomeric ring 68 is bonded to concentric metal rings 72, 74, and the inner metal ring 74 is connected to the follower 66. The rubber ring 68 abuts the seal ring 56 and the outer metal ring 72 overlies, at least partially, the seal ring 56. Axial displacement of the outer metal ring 74 relative to the inner metal ring 72 places the rubber ring 68 in shear. In the illustrated form, the rubber in shear provides the "spring" force to urge one seal ring toward the other. In the initial installation, the position of the follower 66 is adjusted through its connection to the bearing bracket 34, and thus the proper and initial spring force is applied to the seal rings. A threaded member 80 extends axially from the bracket 34. The follower 66 is provided with an opening in its flange 66A to receive the threaded member 80, and nuts 84 and 86 on opposite sides of the follower flange 66A lock the follower 66 in position with respect to the bracket 34. If adjustment of the seal setting is necessary at any time, the adjustment can be easily made. Because the bracket 34 has a fixed spacial relationship with the impeller, the shaft and the follower, the setting of the mechanical seal assembly 12 is maintained when the axial position of the impeller is adjusted.

The follower 66 abuts a flange 88 of the housing 18 and is hydraulically sealed therewith by O-ring 90 which permits relative axial movement of the follower 66 with respect to the housing flange 88. The follower 66, its flange 66A and the nuts 84, 86 are exposed so that the initial seal setting can be made and also for adjustment of the seal setting, if necessary.

The appended claims are intended to cover all reasonable equivalents of the invention. For example, one such equivalent is the use of a pair of rubber blocks placed in shear, the block furnishing the "spring" force to urge each seal ring toward the other. Using the rubber in shear concept for providing a spring force in a mechanical seal assembly is taught in applicant's U.S. Pat. No. 4,418,919, issued Dec. 6, 1983. Also, the inventive concept can be used in a mechanical seal in which one or more coil springs are used to provide the spring force.

I claim:

1. A mechanical seal assembly especially adaptable for use with a rotating device housed in a stationary housing and in which the rotating device has a predetermined and desired spacial relationship with the housing and in which the axial position of the rotating device is adjustable to maintain the predetermined and desired spacial relationship with the housing; said mechanical seal assembly comprising a first seal ring connected to rotate and be axially fixed with respect to said rotating device and a second, non-rotating seal ring, said seal rings having lapped seal faces which oppose one another, said assembly also having means resiliently urging one seal ring toward the other seal ring;

means for adjusting the axial position of said rotating means with respect to said housing; and means fixing the axial position of said second seal ring with respect to said first seal ring and said rotating device, said means fixing the axial position of said second seal ring with respect to said first seal ring being so constructed and arranged that upon adjusting the axial position of said rotating means with respect to the housing, the axial position of said seal rings will remain the same with respect to the rotating device.

2. A mechanical seal assembly as recited in claim 1, in which said means resiliently urging one seal ring toward the other seal ring comprises at least one ring of elastomer and means placing said elastomer ring in shear.

3. A pump-mechanical seal assembly comprising:

a pump housing, a rotating assembly in said housing comprising a shaft, a pump impeller connected to said shaft and a bearing supporting said shaft;

means supporting said bearing;

said rotating assembly and said means supporting said bearing having a fixed spacial relationship and being axially movable with respect to said housing to adjust a spacing of the impeller and the housing;

means permitting axial movement of said rotating assembly and means supporting said bearing with respect to said housing;

a mechanical seal assembly operatively associated with said rotating assembly positioned between said impeller and said means supporting said bearing and axially movable with said rotating assembly and means supporting said bearing; said mechanical seal assembly comprising a pair of seal rings surrounding said shaft with seal faces opposing one another, one seal ring being rotatable with said shaft and said impeller and the other seal ring being stationary and connected to means supporting said bearing;

means for applying a resilient force to at least one of said seal rings to urge it toward the other ring and thereby determine the setting of said seal assembly;

said means for applying said resilient force including means connecting said stationary seal ring to said means supporting said bearing; and means for sealing said stationary seal ring to said housing, while permitting axial movement of said mechanical seal assembly, said rotating assembly and said means supporting said bearing with respect to said housing without change of the setting of said mechanical seal assembly.

4. A pump-mechanical seal assembly as recited in claim 3, in which said means supporting said bearing comprises a cylindrical bracket, and further comprising a cylindrical sleeve member positioned between said stationary seal ring and said bracket and forming the connection therebetween.

5. A pump-mechanical seal assembly as recited in claim 4, further comprising means to initially locate said stationary seal ring with respect to said rotatable seal ring and to adjust the force applied comprising bolt means extending from said bracket and received in said sleeve member and nut means on said bolt means positioning the sleeve member with respect to the bracket.

6. A pump-mechanical seal assembly as recited in claim 5 in which said means for applying a force to at least one of said seal rings comprises a ring of elastomeric material which has been placed in shear.

* * * * *

REEXAMINATION CERTIFICATE (1248th)

United States Patent [19]

Wentworth

[11] B1 4,509,773

[45] Certificate Issued Apr. 10, 1990

[54] PUMP-MECHANICAL SEAL CONSTRUCTION WITH AXIAL ADJUSTMENT MEANS

[75] Inventor: Robert S. Wentworth, Murrieta, Calif.

[73] Assignee: BW/IP International, Inc.

Reexamination Request:
  No. 90/001,680, Dec. 28, 1988

Reexamination Certificate for:
  Patent No.: 4,509,773
  Issued: Apr. 9, 1985
  Appl. No.: 608,627
  Filed: May 9, 1984

[51] Int. Cl.⁴ .............................................. F16J 15/38
[52] U.S. Cl. ..................................... 277/82; 277/9;
    277/84; 277/85; 277/92; 277/93 SD; 384/142;
    415/174.1

[58] Field of Search ................... 277/40, 41, 81 R, 82,
    277/84, 85, 91, 92, 93 R, 93 SD, 105, 106, 112,
    9; 384/142; 415/174.1

[56] References Cited

U.S. PATENT DOCUMENTS

| | | | |
|---|---|---|---|
| 2,592,728 | 4/1952 | Payne | 277/92 X |
| 2,802,679 | 8/1957 | Taltavall | 277/82 X |
| 3,050,310 | 8/1962 | Kuiken | 277/92 X |
| 3,117,794 | 1/1964 | Wachal | 277/92 |
| 3,241,844 | 3/1966 | Morley | 277/92 |
| 3,508,767 | 4/1970 | Christ et al. | 277/85 X |
| 3,977,737 | 8/1976 | Grzina | 384/142 |
| 4,418,919 | 12/1983 | Wentworth | 277/92 X |

FOREIGN PATENT DOCUMENTS

| | | | |
|---|---|---|---|
| 1434687 | 2/1966 | France . | |
| 898196 | 1/1982 | U.S.S.R. | 277/92 |

Primary Examiner—Shoap: Allan N.

[57] ABSTRACT

A pump-mechanical seal assembly in which the setting of the mechanical seal is maintained when the pump impeller's position is adjusted relative to the pump housing, and means to accomplish this objective.

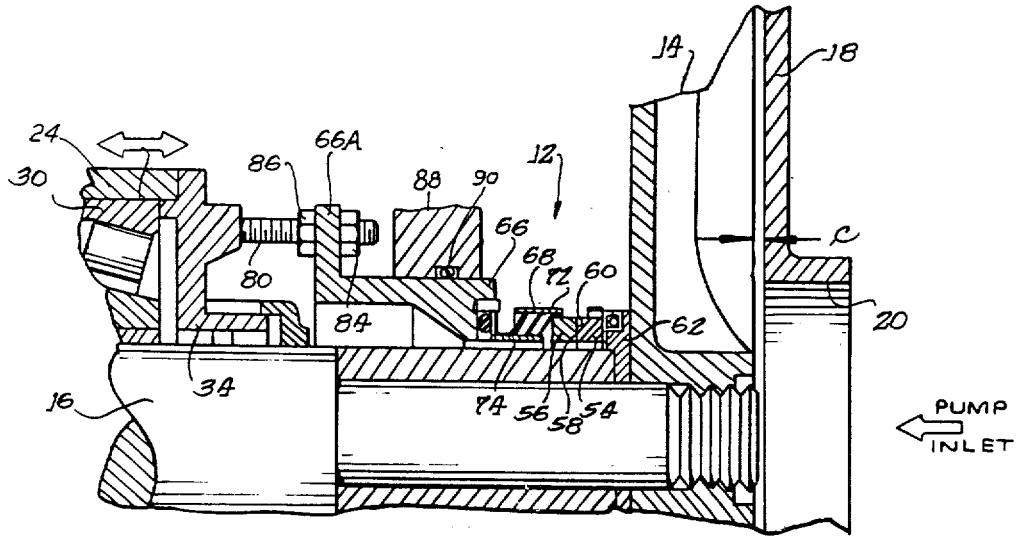

REEXAMINATION CERTIFICATE ISSUED UNDER 35 U.S.C. 307

THE PATENT IS HEREBY AMENDED AS INDICATED BELOW.

Matter enclosed in heavy brckets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4 are cancelled.

Claim 5 is determined to be patentable as amended.

Claim 6, dependent on an amended claim, is determined to be patentable.

New claims 7, 8 and 9 are added and determined to be patentable.

5. A pump-mechanical seal assembly [as recited in claim 4, further] comprising:
   a pump housing;
   a rotating assembly in said housing comprising a shaft, a pump impeller connected to said shaft and a bearing supporting said shaft;
   means supporting said bearing;
   said rotating assembly and said means supporting said bearing having a fixed spacial relationship and being axially movable with respect to said housing to adjust a spacing of the impeller and the housing;
   means permitting axial movement of said rotating assembly and said means supporting said bearing with respect to said housing;
   a mechanical seal assembly operatively associated with said rotating assembly and axially movable therewith positioned between said impeller and said means supporting said bearing; said means supporting said bearing comprising a cylindrical bracket; said mechanical seal assembly comprising a pair of seal rings surrounding said shaft with seal faces opposing one another, one seal ring being rotatable with said shaft and said impeller and the other seal ring being stationary and connected to said means supporting said bearing;
   a cylindrical sleeve member positioned between said stationary seal ring and said bracket and forming the connection therebetween;
   means for applying a resilient force to said stationary seal ring to urge it toward said rotatable seal ring and thereby determine the setting of said seal assembly;
   means to initially locate said stationary seal ring with respect to said rotatable seal ring and to adjust the force applied comprising bolt means extending from said bracket and received in said sleeve member and nut means on said bolt means positioning the sleeve member with respect to the bracket;
   said means for applying said resilient force including means connecting said stationary seal ring to said means supporting said bearing; and
   means for sealing said stationary seal ring to said housing, while permitting axial movement of said rotating assembly and said means supporting said bearing with respect to said housing without change of the setting of said mechanical seal assembly.

7. A pump-mechanical seal assembly comprising:
   a pump housing;
   a rotating assembly in said housing comprising a shaft;
   a pump impeller connected to said shaft;
   a bearing supporting said shaft;
   means supporting said bearing;
   said rotating assembly and said means supporting said bearing having a fixed spacial relationship and being axially movable with respect to said housing to adjust a spacing of the impeller and the housing;
   a mechanical seal assembly operatively associated with said rotating assembly positioned between said impeller and said means supporting said bearing and being movable with said rotating assembly and said means supporting saidbearing;
   said mechanical seal assembly comprising a pair of seal rings surrounding said shaft with seal faces opposing one another, one seal ring being rotatable with said shaft and being located in close proximately to and connected to said impeller, and the other seal ring being stationary with respect to said housing and being connected to said means supporting said bearing;
   said means supporting said bearing comprising a cylindrical bracket and a cylindrical sleeve member is positioned between said stationary seal ring and said bracket to form part of the connection therebetween;
   means for applying a resilient force to said stationary seal ring to urge it toward the rotatable seal ring to thereby determine the setting of saidmechanical seal assembly;
   said means for applying a resilient force to said stationary seal ring comprises a ring of elastomeric material which has been placed in shear;
   means to adjust the resilient force applied to said stationary seal ring;
   means for sealing said stationary seal ring to said housing while permitting limited axial movement of said mechanical seal assembly, said rotating assembly and said means supporting said bearing with respect to said housing without change of the setting of said mechanical seal assembly;
   said means for applying said resilient force being connected between the means supporting the bearing and the stationary seal ring; and
   adjustable means supporting the bearing for adjusting the spacing of the impeller and the housing.

8. A pump-mechanical seal as recited in claim 7, further comprisingmeans initially to locate said stationary seal ring with respect to said rotatable seal ring and to adjust the force applied comprising bolt means extending from said bracket and received in said sleeve member and nut means on said bolt means for adjusting and then fixing the position of the sleeve member with respect to said bracket.

9. A pump-mechanical seal assembly comprising:
   a pump housing;
   a rotating assembly in said housing comprising a shaft, a pump impeller connected to said shaft and a bearing supporting said shaft;
   means supporting said bearing;
   said rotating assembly and said means supporting said bearing having a fixed spacial relationship and being axially movable with respect to said housing to adjust a spacing of the impeller and the housing;
   means permitting axial movement of said rotating assembly and said means supporting said bearing with respect to said housing;

*means abutting said impeller for rotation and axial movement therewith;*

*a mechanical seal assembly operatively associated with said rotating assembly positioned between said impeller and said means supporting said bearing and axially movable with said means supporting said bearing; said mechanical seal assembly comprising a pair of seal rings surrounding said shaft with seal faces opposing one another, one seal ring being rotatable with said shaft and being connected to said means abutting said impeller and the other seal ring being stationary and connected to said means supporting said bearing;*

*said means abutting said impeller comprising a washer-like sleeve rigidly fixing the position of said rotating seal ring with respect to said impeller;*

*means for applying a resilient force to said stationary seal ring to urge it toward the rotatable seal ring and thereby determine the setting of the seal assembly;*

*means for adjusting said resilient force applied to said stationary seal ring;*

*said means for adjusting said resilient force including means connecting said stationary seal ring to said means supporting said bearing; and*

*means for sealing said stationary seal ring to said housing while permitting axial movement of said mechanical seal assembly, said rotating assembly and said means supporting said bearing with respect to said housing without change of the setting of said mechanical seal assembly.*

* * * * *